United States Patent [19]

Morita et al.

[11] Patent Number: 5,405,887
[45] Date of Patent: Apr. 11, 1995

[54] POROUS FILM

[75] Inventors: Kenji Morita; Kohichi Uchiki; Hosei Shinoda, all of Aichi, Japan

[73] Assignee: Mitsui Toatsu Chemicals, Inc., Tokyo, Japan

[21] Appl. No.: 249,994

[22] Filed: May 27, 1994

Related U.S. Application Data

[63] Continuation-in-part of Ser. No. 871,651, Apr. 21, 1992, Pat. No. 5,340,646.

Foreign Application Priority Data

Apr. 26, 1991 [JP] Japan .................................. 3-96538

[51] Int. Cl.$^6$ .............................. D02J 1/06; C08J 9/00
[52] U.S. Cl. .................................. 521/179; 264/288.8; 521/182; 521/97
[58] Field of Search .............................. 521/179, 182; 264/288.8

[56] References Cited

U.S. PATENT DOCUMENTS

| | | | |
|---|---|---|---|
| 4,766,182 | 8/1988 | Murdock | 521/182 |
| 5,210,108 | 5/1993 | Spinu et al. | 521/182 |
| 5,223,546 | 6/1993 | Morita et al. | 521/79 |
| 5,238,968 | 8/1993 | Morita et al. | 521/79 |
| 5,340,646 | 8/1994 | Morita et al. | 428/307.3 |

*Primary Examiner*—Morton Foelak
*Attorney, Agent, or Firm*—Burns, Doane, Swecker & Mathis

[57] ABSTRACT

A breathable, hydrolyzable, porous film having long-term stability in mechanical properties which is obtained by the process comprising adding from 40 to 250 parts by weight of a finely-powdered filler having an average particle size of from 0.3 to 4 $\mu$m to 100 parts by weight of a polylactic acid-based resin composition comprising from 80 to 95% by weight of polylactic acid or a lactic acid-hydroxycarboxylic acid copolymer and from 5 to 20% by weight of a plasticizer comprising a citric acid ester, melting and film-forming the resultant mixture, and successively stretching the thus-obtained film 1.1 times or more at least in the direction of the axis; and which is consequently useful as a material for leak-proof films of sanitary materials such as a paper diaper and packaging materials, and does not accumulate as wastes because of hydrolyzability in the natural environment in the case of being abandoned after use.

6 Claims, No Drawings

POROUS FILM

CROSS REFERENCE TO RELATED APPLICATION

This application is a continuation-in-part of application Ser. No. 07/871,651, filed on Apr. 21, 1992, now U.S. Pat. No. 5,340,646.

BACKGROUND OF THE INVENTION

1. Field of the Invention

The present invention relates to a porous film, and particularly relates to a hydrolyzable, porous film which comprises a polylactic acid-based resin composition essentially consisting of a lactic acid-based polymer having hydrolyzability in the natural environment and a finely-powdered filler.

The porous film of the invention has high moisture permeability and breathability and is also excellent in flexibility, and is hence suitable for uses such as leakproof films for a disposable paper diaper and other sanitary materials, packaging materials and filter media. Additionally the porous film is prepared from the polylactic acid-based resin composition and has hydrolyzability. Consequently, the porous film is expected for a countermeasure of waste disposal which has recently been a serious problem.

2. Description of the Related Art

Porous films have already been prepared by blending a specific proportion of an organic or inorganic incompatible matter with polyolefine-based resin, melting, film-forming and stretching the resultant film as disclosed in Japanese Patent Publication Sho 53-2542 and Japanese Laid-Open Patent Sho 56-99242, 57-59727, 60-129240 and 62-138541.

These porous films are mainly used for leakproof films for sanitary materials such as a disposable paper diaper and packaging materials, and are generally applied to so-called throw away uses where the films are abandoned immediately after use.

However, the porous films prepared from polyolefine-based resin cannot be hydrolyzed or have a very slow rate of hydrolysis in the natural environment. As a result, these films remain semipermanently when buried under the ground after use. Disposal of these films in the ocean causes aesthetic damage or destruction of the living environment of marine organisms. Thus, disposal of wastes has become a social problem with expansion in consumption.

On the other hand, polylactic acid and its copolymer have been known as a thermoplastic and hydrolyzable polymer. For example, U.S. Pat. No. 1,995,970 discloses a preparation process of a lactic acid-based polymer by polymerization of lactic acid, lactide or a mixture of these compounds.

These lactic acid-based polymers can be obtained by fermentation of inexpensive materials such as corn starch and corn syrup and can also be prepared from petrochemicals such as ethylene. The lactic acid-based polymer, however, is generally high in hardness and hence has a disadvantage of having low flexibility when used in the form of a film. Consequently, the lactic acid-based polymer has been thought to have many restrictions in use and a porous film of the lactic acid-based polymer has not yet been known.

That is, a porous film consisting of polylactic acid or its copolymer which has hydrolyzability in the natural environment has not yet been known and is a material for providing useful goods in view of the above market demand and protection of the natural environment. Thus, the development of the lactic acid-based porous films has been strongly desired.

SUMMARY OF THE INVENTION

An object of the present invention is to provide a porous film which is plasticized, if desired, and has hydrolyzability.

Another object of the present invention is to provide a porous film which is plasticized and has hydrolizability and moreover which is excellent in long-term stability of mechanical properties such as tensile strength and so on.

As a result of an intensive investigation in order to accomplish the above object, the present inventors have found that a porous film having suitable flexibility and hydrolyzability can be obtained by adding a specific amount of a finely-powdered filler to a specific amount of a polylactic acid-based resin composition comprising a specific amount of a lactic acid-based polymer and a specific amount of a plasticizer, melting and film-forming the resultant mixture, and stretching the thus-obtained film. Thus, the present invention has been completed.

One aspect of the present invention is a porous film obtained by the process comprising adding from 40 to 250 parts by weight of a finely-powdered filler having an average particle size of from 0.3 to 4 μm 100 parts by weight of a polylactic acid-based resin composition comprising from 80 to 100% by weight of polylactic acid or a lactic acid-hydroxycarboxylic acid copolymer and from 0 to 20% by weight of a plasticizer, melting and film-forming the resultant mixture, and successively stretching the thus-obtained film 1.1 times or more at least in the one direction of the axis. The hydrolyzable, porous film of the invention is characterized by hydrolyzability and is prepared by adding the finely-powdered filler having a specific particle size to the polylactic acid-based resin composition having a specific composition, mixing with a Henschel mixer, successively melt-kneading after pelletizing or as intact with a single- or twin-screw extruder, delivering through a ring or flat die to form a film, and stretching to provide porosity for the thus-obtained film.

The porous film of the invention has breathability, can provide various grades of flexibility and stiffness, and additionally is hydrolyzable. Consequently, the film is useful as a material for leakproof films of sanitary materials such as a paper diaper and packaging materials. The film is hydrolyzed in the natural environment in the case of discarding after use and hence does not accumulate in the form of industrial wastes.

DETAILED DESCRIPTION OF THE INVENTION

The lactic acid-based polymer of the present invention is polylactic acid or a copolymer of lactic acid and hydroxycarboxylic acid. Exemplary hydroxycarboxylic acid includes glycolic acid, hydroxybutyric acid, hydroxyvaleric acid, hydroxypentanoic acid, hydroxycaproic acid and hydroxyheptanoic acid. Preferred hydroxycarboxylic acid is glycolic acid and hydroxycaproic acid.

Preferred molecular structure of polylactic acid is composed of from 85 to 100% by mole of an L-lactic acid unit or D-lactic acid unit and from 0 to 15% by mole of the antipode unit of each lactic acid. The copolymer of lactic acid and hydroxycarboxylic acid is composed of from 85 to less than 100% by mole of an L-lactic acid unit or D-lactic acid unit and less than 15% by mole of a hydroxycarboxylic acid unit.

The lactic acid-based polymer can be prepared by selecting the raw material monomer required for obtaining a desired polymer structure from L-lactic acid, D-lactic acid and hydroxycarboxylic acid and carrying out dehydrating polycondensation. The polymer can be preferably prepared by using lactide which is a cyclic dimer of lactic acid, glycolide which is a cyclic dimer of glycolic acid, and caprolactone and carrying out ring-opening polymerization.

The lactide includes L-lactide which is a cyclic dimer of L-lactic acid, D-lactide which is a cyclic dimer of D-lactic acid, meso-lactide obtained by cyclizing dimerization of D-lactic acid and L-lactic acid, and DL-lactide which is a racemic mixture of D-lactide and L-lactide. Any of these compounds can be used for the invention. However, preferred main materials are D-lactide and L-lactide.

The lactic acid-based polymer which can be preferably used for the invention is a lactic acid-based polymer essentially consisting of from 85 to 100% by mole of an L-lactic acid unit or D-lactic acid unit and from 0 to 15% by mole of the antipode lactic acid unit and/or glycolic acid unit.

The lactic acid-based polymer can be prepared by the following processes ① to ⑥.

① About 85% by mole or more of L-lactide is copolymerized with about 15% by mole or less of D-lactide and/or glycolide.
② About 85% by mole or more of D-lactide is copolymerized with about 15% by mole or less of L-lactide and/or glycolide.
③ About 70% by mole or more of L-lactide is copolymerized with about 30% by mole or less of DL-lactide and/or glycolide.
④ About 70% by mole or more of L-lactide is copolymerized with about 30% by mole or less of meso-lactide and/or glycolide.
⑤ About 70% by mole or more of D-lactide is copolymerized with about 30% by mole or less of DL-lactide and/or glycolide.
⑥ About 70% by mole or more of D-lactide is copolymerized with about 30% by mole or less of meso-lactide and/or glycolide.

The lactic acid-based polymer has preferably a high molecular weight. The inherent viscosity of the polymer at 25° C. in a chloroform solution having a concentration of 0.5 g/dl is preferably 1~10, more preferably 3~7.

When the inherent viscosity is less than 1, melt viscosity is too low, the polymer causes drooling from the die slit of the extruder and thus processing becomes difficult. Additionally, the product thus obtained is very brittle and difficult to handle. On the other hand, an inherent viscosity exceeding 10 causes too high melt viscosity and unfavorably gives adverse effect on the melt extrudability of the polymer.

Catalysts are preferably used in order to obtain a high molecular weight polymer within a short time by the polymerization of lactide or copolymerization of lactide and glycolide.

The polymerization catalysts which can be used are various compounds capable of exhibiting catalytic effect on the polymerization reaction. Exemplary catalysts include stannous octoate, tin tetrachloride, zinc chloride, titanium tetrachloride, iron chloride, boron trifluoride ether complex, aluminum chloride, antimony trifluoride, lead oxide and other polyvalent metal compounds. Tin compounds and zinc compounds are preferably used. Stannous octoate is particularly preferred in these tin compounds. The amount is preferably in the range of from 0.001 to 0.1% by weight for the weight of lactide or the total weight of lactide and glycolide.

Known chain extenders can be used for the polymerization. Preferred chain extenders are higher alcohols such as lauryl alcohol and hydroxy acids such as lactic acid and glycolic acid. Polymerization rate increases in the presence of a chain extender and polymer can be obtained within a short time.

Molecular weight of the polymer can also be controlled by varying the amount of the chain extender. However, too much amount of the chain extender tends to decrease molecular weight of polymer formed. Hence, the amount of the chain extender is preferably 0.1% by weight or less for lactide or for the total weight of lactide and glycolide.

Polymerization or copolymerization can be carried out in the presence or absence of a solvent. Bulk polymerization in a molten state of lactide or glycolide is preferably carried out in order to obtain high molecular weight polymer.

In the case of molten polymerization, polymerization temperature may be generally above the melting point (around 90° C.) of the monomer, lactide or glycolide. In the case of solution polymerization which uses solvents such as chloroform, polymerization can be carried out at temperature below the melting point of lactide or glycolide. In any case, polymerization temperature above 250° C. is unfavorable because decomposition of formed polymer develops.

The polylactic acid-based resin composition of the invention comprises from 80 to 100% by weight of the above lactic acid-based polymer and from 0 to 20% by weight of a plasticizer.

The plasticizers which can be used include, for example, di-n-octyl phthalate, di-2-ethylhexyl phthalate, dibenzyl phthalate, di-iso-octyl phthalate and other phthalic acid derivatives; di-n-butyl adipate, dioctyl adipate and other adipic acid derivatives; di-n-butyl maleate and other maleic acid derivatives; tri-n-butyl citrate and other citric acid derivatives; monobutyl itaconate and other itaconic acid derivatives; butyl oleate and other oleic acid derivatives; glycerol monoricinolate and other ricinoleic acid derivatives; tricresyl phosphate, trixylenyl phosphate and other phosphoric acid esters; lactic acid, straight chain lactic acid oligomer, cyclic lactic acid oligomer and lactide. These plasticizers can be used singly or as a mixture. In these plasticizers, lactic acid, straight chain lactic acid oligomer, cyclic lactic acid oligomer and lactide are preferably used in view of their plasticizing effect. Lactic acid oligomers used for the plasticizer can be prepared with ease by hot-dehydrating condensation of lactic acid at 50° to 280° C.

The oligomer thus obtained usually has a polymerization degree in the range of from 1 to 30. The oligomer can also be prepared by heating glycolide or lactide at 50° to 280° C. in the presence of water and glycolic acid or lactic acid. The oligomer also includes lactide, i.e., cyclic dimer of lactic acid which is used as a monomer in the preparation of lactic acid-based polymer.

The lactic acid-based polymer is effectively plasticized by the addition of the plasticizer and resulting resin composition becomes flexible. When the amount of the plasticizer is 5% by weight or more, flexibility can be clearly observed. However, an amount exceeding 20% by weight gives adverse effect on the melt-extension and stretching of the resin composition and unfavorably decreases mechanical strength of the porous film obtained.

The plasticizer is blended with the lactic acid-based polymer by dissolving the polymer in a solvent such as chloroform, methylene chloride, toluene or xylene, or heat-melting the polymer at 100° to 280° C., and thereafter adding and mixing a prescribed amount of the plasticizer.

Lactic acid or lactic acid oligomer including lactide which is a preferred plasticizer is mixed, for example, by the following methods:

(a) Polymerization of lactide or copolymerization of lactide and glycolide is stopped before completion to leave unreacted lactide.

(b) After completing polymerization of lactide or copolymerization of lactide and glycolide, a prescribed amount of lactic acid or a lactic acid oligomer including lactide is added and mixed. Methods (a) and (b) can be incorporated.

In the method (a), unreacted lactide is uniformly mixed with the lactic acid-based polymer on microscopic observations and exhibits good plasticizing performance. Reaction of monomer (lactide) is started by heating in the presence of a catalyst, in the coexistence of a chain extender, if desired, and stopped by finishing the heating at the time when the residual monomer concentration reaches to a prescribed level. The amount of residual monomer in the resulting lactic acid-based polymer can be determined by gas chromatographic analysis or thermogravimetric analysis.

In the method (b), after finishing polymerization, the resulting lactic acid-based polymer is dissolved in a solvent such as chloroform, methylene chloride, toluene and xylene, or heat-melted at temperature of 100° to 280° C. and successively a prescribed amount of lactic acid or the lactic acid oligomer is added and mixed. The method has an advantage of readily controlling the amount of lactic acid or the lactic acid oligomer in the resin composition.

The polylactic acid-based resin composition obtained above is compression-molded or melt-extruded at temperature of 180° to 280° C. into films, sheets or bars. These molded articles are cooled to about −20° C. with dry ice-methanol and crushed with a hammer mill. Alternatively, the resin composition can also be melt-extruded into a strand and cut into pellets.

The polylactic acid-based resin composition thus crushed or pelletized is then mixed with a finely-powdered filler. The finely-powdered filler may be mixed with the lactic acid-based polymer simultaneously with blending of the plasticizer.

The plasticizer affects long-term stability of mechanical properties such as tensile strength and so on of the porous film obtained. When it is considered, especially preferable plasticizers are citric acid derivatives among the above plasticizers. More preferable plasticizers are acetyl tributyl citrate and acetyl triethyl citrate. The decreasing trend in tensile strength of the porous film containing the above plasticizer is little even after 2 years.

Lactic acid, lactic acid oligomer and lactide are excellent in plasticizing effect, and hence, a flexible porous film is obtained with ease. However, a porous film which contains 10% by weight or more of plasticizers such as lactic acid, lactic acid oligomer and lactide is not necessarily sufficient in the long-term stability of mechanical properties such as tensile strength and so on. To disclose more concretely, while the above porous film does not show a decreasing trend in tensile strength for half a year after production, it does gradually show a decreasing trend in tensile strength after a year or more.

On the other hand, a porous film plasticized by a citric acid derivative does not show a decreasing trend in tensile strength even after a year or more. Therefore, use of the citric acid derivative as a plasticizer is preferable, when it is desired to obtain a porous film of a lactic acid-based polymer which has low hydrolyzability and excellent long-term stability of mechanical properties such as tensile strength and so on.

Exemplary citric acid derivative as a plasticizer includes triethyl citrate, tributyl citrate, monoisopropyl citrate, monostearyl citrate, distearyl citrate, tristearyl citrate, acetyl triethyl citrate, acetyl tributyl citrate, acetyl tri-2-ethylhexyl citrate and the like. Preferred citric acid derivative is acetyl tributyl citrate, acetyl triethyl citrate and tributyl citrate.

The finely-powdered filler which can be used for the invention is inorganic or organic fine powder.

Exemplary inorganic fine powder includes calcium carbonate, magnesium carbonate, barium carbonate, magnesium sulfate, barium sulfate, calcium sulfate, zinc oxide, magnesium oxide, calcium oxide, titanium oxide, barium oxide, aluminum oxide, aluminium hydroxide, hydroxyapatite, silica, mica, talc, kaolin, clay, glass powder, asbestos powder, zeolite and acid clay. Particularly preferred inorganic fillers are calcium carbonate, magnesium oxide, barium sulfate, silica and acid clay.

The organic fine powder includes, for example, wood flour, pulp powder and other cellulosic powder.

The finely-powdered filler preferably has an average particle size of from 0.3 to 4 $\mu$m, and more preferably has a specific surface area of 15 m$^2$/g or less in addition to this range of the average particle size. The most preferred filler has a specific surface area in the range of from 0.5 to 5 m$^2$/g.

An average particle size exceeding 4 $\mu$m gives adverse effect on the stretching ability of the film and sometimes leads to film breakage prior to uniform whitening. Consequently, stability of operation becomes poor and uniform porosity of the film is difficult to obtain. When the average particle size is less than 0.3 $\mu$m, high filling of the inorganic fine particle becomes difficult and it is impossible to make the film porous. On the other hand, when the specific surface area exceeds 15 m$^2$/g, the form of the inorganic finely-powdered filler becomes amorphous, needle or plate. Consequently, particle size distribution becomes broad, stretching ability of the film decreases, and processing ability for making the porous film is unfavorably impaired.

The amount of the finely-powdered filler for use in the invention is from 40 to 250 parts by weight, preferably from 60 to 150 parts by weight per 100 parts by weight of the polylactic acid-based resin composition. An amount less than 40 parts by weight leads to insufficient porosity and low percentage of open cells, and hence satisfactory breathability and moisture permeability cannot be obtained. On the other hand, an amount exceeding 250 parts by weight gives adverse effect on the melt-extendability, film-forming ability and stretching ability.

Next, preparation process of the porous film of the invention will be illustrated.

The finely-powdered filler is added to the polylactic acid-based resin composition, mixed for 5 to 30 minutes at room temperature with a blender such as Henschel mixer, super mixer and tumbling mixer, followed by melt-kneading with a common single- or twin-screw extruder and pelletizing the extrudate.

The pellets thus-obtained are successively processed into a film by an inflation method or T-die extrusion method. The film can also be obtained directly from the extruder without pelletizing.

Extrusion temperature is preferably in the range of from 100° to 270° C., more preferably in the range of from 130° to 250° C. When the temperature is lower than 100° C., extrusion stability is difficult to obtain and overload is liable to occur. On the other hand, a temperature exceeding 270° C. is unfavorable because decomposition of the lactic acid-based polymer becomes violent.

The die of the extruder used in the invention is a ring or flat die. Temperature range of the die is about the same as extruding temperature.

Successively, the extrudate is stretched from 1.1 to 10 times, preferably from 1.1 to 7 times at least in the direction of the axis. Stretching can be carried out in multi-steps or conducted biaxially. When the degree of stretching is less than 1.1 times, the porosity of the film is unsatisfactory. The degree of stretching exceeding 10 times often leads to unfavorable breakage of the film.

Preferred stretching temperature is in the range of from the glass transition temperature (Tg) of the lactic acid-based polymer to Tg+50° C. After stretching, heat setting can be carried out in order to enhance form stability of the pores.

Thickness of the porous film differs depending upon uses and is generally in the range of from 10 to 300 μm.

Colorants, reinforcements and other types of fillers can also be added unless the object of the invention is impaired.

The present invention will hereinafter be illustrated further in detail by way of examples.

Following evaluation methods were used in the examples.

① Amount of residual monomer

After finishing the polymerization reaction, the reaction mixture was dissolved in hexafluoroisopropanol (hereinafter referred to as HFIP) or methylene chloride to obtain a solution having known concentration. Residual monomer was determined by gas chromatography.

② Inherent viscosity

A lactic acid-based polymer is dissolved in chloroform (concentration; 0.5 g/dl), viscosity of the resulting solution was measured at 25°±0.5° C. with a Ubbelohde viscometer, and inherent viscosity η was calculated from the following equation.

$$\eta = \log(T_1/T_0)/C$$

wherein
  To: Measuring time of the solvent (sec)
  $T_1$: Measuring time of the solution (sec)
  C: Concentration of the sample solution (g/dl)
③ Specific surface area Measured by the BET absorption method ④ Average particle size A powder specific surface area tester (permeation method) Model SS-100 (manufactured by Shimadzu Seisaku-sho Co.) was used. To a sample cylinder having a sectional area of 2 cm² and a height of 1 cm, 3 g of the sample was filled, and the average particle size was calculated from the time required for permeating 50 cc of the air through the filled layer under the pressure of 500 mmH₂O.

⑤ Permeability

Measured in accordance with ASTM-E-96-66

⑥ Polymerization degree of oligomer

An oligomer was dissolved in tetrahydrofuran or chloroform, distribution of the polymerization degree was measured by gel permeation chromatography (GPC) to calculate polymerization degree of the oligomer.

⑦ Tensile strength

A tensile strength tester Model Universal Material Tester UCT (manufactured by Orientec Co. Ltd.) was used. Film samples just produced and film samples left for a year under the conditions of 60% of relative humidity at 23° C. were measured in the longitudinal direction by the tester in accordance with JIS Z-1702.

Preparation Example

To a reaction vessel, 1.8 kg of L-lactide and 1.0 kg of an aqueous lactic acid solution having a concentration of 87% by weight were charged and heated for 2 hours at 100° C. The reaction mixture was cooled to the room temperature. A viscous transparent liquid was obtained. As a result of GPC analysis, the liquid contained lactic acid and a lactic acid oligomer. An average polymerization degree was 2.8. The product was hereinafter referred to as LA-oligomer.

Examples 1~14, and Comparative Examples 1~3

Marketed L-lactide (hereinafter referred to as L-LTD), D-lactide (hereinafter referred to as D-LTD), DL-lactide (hereinafter referred to as DL-LTD) and glycolide (hereinafter referred to as GLD) were individually recrystallized 4 times from ethyl acetate.

ε-Caprolactone (hereinafter referred to as CL) was dried over calcium hydride and distilled.

To a glass reaction vessel having a silane-treated internal surface, the above-purified L-LTD, D-LTD, DL-LTD, GLD, CL and a catalyst stannous octoate were respectively charged in an amount illustrated in Table 1. Then the resulting mixture was dried for 24 hours by evacuating the reaction vessel.

The reaction vessel was heated to the prescribed temperature illustrated in Table 1 and polymerization was carried out for the prescribed time. After finishing the reaction, the reaction mixture was discharged from the vessel. The lactic acid-based polymers thus-obtained were referred to as P1~P6.

The inherent viscosity and residual monomer content were measured and results are illustrated in Table 1.

TABLE 1

| Lactic acid-based polymer | P1 | P2 | P3 | P4 | P5 | P6 |
|---|---|---|---|---|---|---|
| L-LTD (wt. parts) | 100 | 70 | 95 | 75 | 50 | 80 |
| DL-LTD (wt. parts) | — | 30 | — | 30 | 50 | — |
| D-LTD (wt. parts) | — | — | 5 | — | — | — |
| GLD (wt. parts) | — | — | — | 5 | — | — |
| CL (wt. parts) | — | — | — | — | — | 20 |
| Catalyst (wt. %) | 0.015 | 0.015 | 0.015 | 0.015 | 0.015 | 0.015 |

TABLE 1-continued

| Lactic acid-based polymer | P1 | P2 | P3 | P4 | P5 | P6 |
|---|---|---|---|---|---|---|
| Polymerization temperature (°C.) | 110 | 120 | 110 | 120 | 125 | 120 |
| Polymerization time (hr) | 160 | 120 | 40 | 120 | 100 | 140 |
| Inherent viscosity | 4.2 | 6.1 | 3.8 | 5.1 | 5.4 | 4.3 |
| Residual monomer (wt. %) | 1.3 | 0.9 | 13.1 | 1.1 | 1.5 | 1.9 |

Next, L-LTD or LA-oligomer obtained in the Preparation Example was added to these lactic acid-based polymers in a proportion illustrated in Table 2, mixed with a plastomill at temperature illustrated in Table 2 to obtain polylactic acid-based resin compositions C1 to C7.

These resin compositions were pressed under the pressure of 100 kg/cm² at the temperature illustrated in Table 2 to obtain a sheet having a thickness of 1 mm.

TABLE 2

| Composition | C1 | C2 | C3 | C4 | C5 | C6 | C7 |
|---|---|---|---|---|---|---|---|
| Lactic acid-base polymer (wt. %) | P1 80 | P2 90 | P2 80 | P2 90 | P4 80 | P5 90 | P6 90 |
| Additive (wt. %) | LA oligomer 20 | LA oligomer 10 | LA oligomer 20 | LTD monomer 10 | LA oligomer 20 | LA oligomer 10 | LA oligomer 10 |
| Melt-mixing temperature (°C.) | 210 | 150 | 150 | 150 | 150 | 130 | 130 |
| Press temperature (°C.) | 210 | 150 | 150 | 150 | 150 | 130 | 130 |

The polylactic acid-based resin composition illustrated in Table 3 was cooled with liquid nitrogen, crushed with a hammer mill, and followed by adding a finely-powdered filler having an average particle size illustrated in Table 3 in an amount illustrated in Table 3 for 100 parts by weight of the polylactic acid-based resin composition and mixing with a Henschel mixer at the room temperature.

The resulting mixture was pelletized with a twin-screw extruder.

TABLE 3

| | Polylactic acid-based resin composition | Finely-powdered filler Compound | Average particle size (μm) | Amount (wt part) |
|---|---|---|---|---|
| Example | | | | |
| 1 | P1 | Precipitated BaSO$_4$ | 0.8 | 200 |
| 2 | P2 | ↑ | 0.8 | 120 |
| 3 | P3 | ↑ | 0.5 | 50 |
| 4 | P5 | MgO | 1.1 | 80 |
| 5 | P6 | Precipitated BaSO$_4$ | 1.1 | 120 |
| 6 | C1 | ↑ | 1.1 | 120 |
| 7 | C2 | ↑ | 1.1 | 120 |
| 8 | C2 | Precipitated CaCO$_3$ | 0.8 | 120 |
| 9 | C2 | ↑ | 0.5 | 80 |
| 10 | C3 | ↑ | 0.5 | 50 |
| 11 | C4 | Heavy CaCO$_3$ | 2.6 | 120 |
| 12 | C5 | Precipitated BaSO$_4$ | 3.0 | 120 |
| 13 | C5 | ↑ | 3.5 | 120 |
| 14 | C7 | ↑ | 3.5 | 120 |
| Comparative Example | | | | |
| 1 | P1 | — | — | 0 |
| 2 | P1 | Precipitated BaSO$_4$ | 0.8 | 30 |
| 3 | C2 | ↑ | 0.8 | 300 |

The pellets obtained were melted with a single-screw extruder and delivered through a T-die at 230° C. The extruded film was formed so as to give, after stretching, a porous film having a thickness illustrated in Table 4.

Successively, the film was stretched with rolls at 60° C. to the uniaxial or biaxial direction with a degree of stretching illustrated in Table 4 to obtain a porous film.

Properties of the porous film thus-obtained were evaluated and results are illustrated in Table 4.

TABLE 4

| | Stretching degree (times) | Thickness (μm) | Moisture permeability (g/m²/24 hr) | Tensile strength* kg/cm² | | | | Remark |
|---|---|---|---|---|---|---|---|---|
| | | | | 0 year | 0.5 year | 1 year | 2 years | |
| Example | | | | | | | | |
| 1 | 2 | 36 | 1500 | 175 | 172 | 170 | 160 | |
| 2 | 7 | 35 | 2500 | 167 | 163 | 160 | 148 | |
| 3 | 3 × 3 | 35 | 5500 | 130 | 120 | 90 | 42 | |
| 4 | 5 | 34 | 1800 | 154 | 150 | 145 | 131 | |
| 5 | 4 | 36 | 2100 | 170 | 166 | 163 | 150 | |
| 6 | 7 | 36 | 2400 | 155 | 138 | 118 | 64 | |
| 7 | 5 | 35 | 2200 | 128 | 122 | 90 | 45 | |
| 8 | 5 | 36 | 2100 | 147 | 137 | 102 | 51 | |
| 9 | 5 | 34 | 1900 | 119 | 112 | 88 | 56 | |
| 10 | 5 | 35 | 1700 | 126 | 121 | 94 | 35 | |
| 11 | 5 | 36 | 2400 | 144 | 137 | 110 | 30 | |
| 12 | 5 | 35 | 2500 | 132 | 126 | 101 | 49 | |
| 13 | 5 | 35 | 2800 | 170 | 161 | 131 | 62 | |
| 14 | 5 | 35 | 2500 | 140 | 134 | 104 | 38 | |
| Comparative | | | | | | | | |

TABLE 4-continued

| Example | Stretching degree (times) | Thickness (μm) | Moisture permeability (g/m²/24 hr) | Tensile strength* kg/cm² | | | | Remark |
|---|---|---|---|---|---|---|---|---|
| | | | | 0 year | 0.5 year | 1 year | 2 years | |
| 1 | 1 | 34 | 220 | — | — | — | — | *1 |
| 2 | 7 | 36 | <400 | — | — | — | — | *2 |
| 3 | — | — | — | — | — | — | — | *3 |

*tensile strength in the direction of MD, wherein 0, 0.5 year and a year mean just produced time, 0.5 year after production and 1 year after production, respectively.
*1: unstretched;
*2: fluctuated permeability;
*3: extrusion impossible As illustrated in Table 4, the porous films obtained in Examples 3 and 6-14, which contained 10% or more by weight of lactide or a lactic acid oligomer as plasticizers, did not show a decreasing trend in tensile strength for half a year after production, but it gradually showed decreasing trends in tensile strength after a year or more. Further, decreasing trends in tensile strength of porous films obtained in Examples 15~18, 20 and 21 were little even after 2 years. On the other hand, the porous films obtained in Examples 1, 2, 4, and 5, which contained less than 10% by weight of lactide or a lactic acid oligomer, did not almost show a decreasing trend in tensile strength even after a year.

Next, the porous film obtained in Examples 1, 2 and 5 and a porous film of polyolefine resin (Espoal N; Trade Mark of Mitsui Toatsu Chemicals Inc.) were respectively immersed in distilled water at 37° C. After 120 days, weight loss was 7%, 13%, 21% and 0%, respectively.

Examples 15~21

Polylactic acid-based resin compositions C8 to C11 were obtained by the same procedures as Example 1 except that lactic acid-based polymers P-1, P-2 or P-4 and acetyl tributyl citrate, acetyl triethyl citrate or tributyl citrate as a plasticizer were mixed in a proportion as illustrated in Table 5. Results are illustrated in Table 5.

Next, the polylactic acid-based resin composition was added with precipitated $BASO_4$ or precipitated $CaCO_3$ as a finely-powdered filler in a proportion as illustrated in Table 6 and mixed by a Henschel mixer at room temperature. The resulting mixture was pelletized with a twin-screw extruder. The pellets obtained were melted with a single-screw extruder and delivered through a T-die at 230° C. Thus, the polylactic acid-based film containing a plasticizer and a finely-powdered filler was obtained.

Successively, the film was uniaxially stretched with 5 times stretching in the longitudinal direction of the film so as to form a porous film. Thickness, moisture permeability and tensile strength were evaluated by the prescribed methods and results are illustrated in Table 7.

As set forth in Table 7, the porous films obtained in Examples 15-21, which contained citric acid derivatives as plasticizers, did not almost show a decreasing trend in tensile strength even after a year or more.

TABLE 5

| Composition | C8 | C9 | C10 | C11 |
|---|---|---|---|---|
| Lactic acid-based polymer (wt %) | P1 80 | P2 90 | P2 80 | P4 80 |
| Additive (wt %) | Acetyl tributyl citrate 20 | Acetyl tributyl citrate 10 | Tributyl citrate 20 | Acetyl triethyl citrate 20 |
| Melt-mixing temperature (°C.) | 140 | 140 | 130 | 140 |
| Press temperature (°C.) | 140 | 140 | 130 | 140 |

TABLE 6

| Example | Polylactic acid-based resin composition | Finely-powdered filler | | |
|---|---|---|---|---|
| | | Compound | Average particle size (μm) | Amount (wt part) |
| 15 | C8 | Precipitated $BaSO_4$ | 1.1 | 120 |
| 16 | C9 | ↑ | 1.1 | 120 |
| 17 | C9 | ↑ | 0.8 | 120 |
| 18 | C9 | ↑ | 0.5 | 80 |
| 19 | C10 | Precipitated $CaCO_3$ | 0.5 | 50 |
| 20 | C11 | Precipitated $BaSO_4$ | 3.0 | 120 |
| 21 | C11 | ↑ | 3.5 | 120 |

TABLE 7

| Example | Stretching degree (times) | Thickness (μm) | Moisture permeability (g/m²/24 hr) | Tensile strength* kg/cm² | | | |
|---|---|---|---|---|---|---|---|
| | | | | 0 year | 0.5 year | 1 year | 2 years |
| 15 | 5 | 35 | 2400 | 128 | 125 | 122 | 110 |
| 16 | 5 | 37 | 2700 | 130 | 128 | 125 | 115 |
| 17 | 5 | 34 | 2400 | 175 | 171 | 169 | 155 |
| 18 | 5 | 33 | 2800 | 154 | 151 | 150 | 142 |
| 19 | 5 | 35 | 2200 | 138 | 137 | 134 | 70 |
| 20 | 5 | 36 | 2100 | 143 | 141 | 141 | 131 |
| 21 | 5 | 35 | 2600 | 130 | 128 | 123 | 113 |

*tensile strength in the direction of MD, wherein 0, 0.5 year and 1 year mean just produced time, 0.5 year after production and 1 year after production, respectively.

What is claimed is:

1. A porous film obtained by the process comprising adding from 40 to 250 parts by weight of a finely-powdered filler having an average particle size of from 0.3 to 4 μm to 100 parts by weight of a polylactic acid-based resin composition comprising from 80 to 95% by weight of polylactic acid comprising from 85 to 100% by mol of an L-lactic acid unit and from 0 to 15% by mol of a D-lactic acid unit, or from 85 to 100% by mol of a D-lactic acid unit and from 0 to 15% by mol of an L-lactic acid unit or a lactic acid-hydroxycarboxylic acid copolymer comprising from 85 to 100% by mole of an L-lactic acid unit and from 0 to 15% by mole of a glycolic acid unit, or from 85 to 100% by mole of a D-lactic acid unit and from 0 to 15% by mole of a glycolic acid unit and from 5 to 20% by weight of a plasticizer comprising a citric acid ester, melting and film-forming the resultant mixture in the temperature range of 100°, to 270° C., and successively stretching the thus-obtained film 1.1 times or more in at least the direction of the axis in the temperature range of from the glass transition temperature of the lactic acid based polymer to 50° above said glass transition temperature.

2. The porous film of claim 1 wherein the finely-powdered filler is inorganic powder.

3. The porous film of claim 1 wherein the finely-powdered filler is barium sulfate, calcium carbonate or magnesium oxide.

4. The porous film of claim 1 wherein the citric acid ester is tributyl citrate.

5. The porous film of claim 1 wherein the citric acid ester is selected from the group consisting of triethyl citrate, monoisopropyl citrate, monostearyl citrate, distearyl citrate, tristearyl citrate, acetyl triethyl citrate, acetyl tributyl citrate, acetyl tri-2-ethylhexyl citrate.

6. The porous film of claim 1 wherein the citric acid ester is selected from the group consisting of acetyl tributyl citrate and acetyl triethyl citrate.

* * * * *

UNITED STATES PATENT AND TRADEMARK OFFICE
CERTIFICATE OF CORRECTION

PATENT NO. : 5,405,887

DATED: : April 11, 1995

INVENTOR(S) : Morita et al

It is certified that error appears in the above-identified patent and that said Letters Patent is hereby corrected as shown below:

In claim 1, column 13, line 12, delete the comma "," after "100°"; and column 13, line 16, after "50°" insert --C--.

Signed and Sealed this

Twenty-fourth Day of October, 1995

*Attest:*

BRUCE LEHMAN

*Attesting Officer*  *Commissioner of Patents and Trademarks*